(12) United States Patent
Shankar et al.

(10) Patent No.: US 11,144,407 B1
(45) Date of Patent: Oct. 12, 2021

(54) SYNCHRONOUS DATABASE GEO-MIRRORING USING DELAYED VISIBILITY WRITE OPERATIONS

(71) Applicant: Amazon Technologies, Inc., Seattle, WA (US)

(72) Inventors: Ramesh Shankar, Redmond, WA (US); Murali Brahmadesam, Woodinville, WA (US); Raman Mittal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

(21) Appl. No.: 16/588,868

(22) Filed: Sep. 30, 2019

(51) Int. Cl.
| | | |
|---|---|---|
| *G06F 11/00* | (2006.01) | |
| *G06F 11/14* | (2006.01) | |
| *G06F 16/27* | (2019.01) | |

(52) U.S. Cl.
CPC ...... *G06F 11/1469* (2013.01); *G06F 11/1471* (2013.01); *G06F 16/275* (2019.01); *G06F 2201/80* (2013.01)

(58) Field of Classification Search
CPC .. G06F 16/273; G06F 16/275; G06F 2201/80; G06F 2201/82; G06F 2201/855; G06F 11/1469; G06F 11/1471; G06F 11/2056; G06F 11/2064
See application file for complete search history.

(56) References Cited

U.S. PATENT DOCUMENTS

| | | |
|---|---|---|
| 6,199,074 B1 | 3/2001 | Kern et al. |
| 7,225,307 B2 | 5/2007 | Micka et al. |
| 7,424,592 B1 | 9/2008 | Karr et al. |
| 2005/0256972 A1 | 11/2005 | Cochran et al. |
| 2009/0265518 A1 | 10/2009 | McClure |
| 2013/0138903 A1 | 5/2013 | Matsui et al. |
| 2013/0166505 A1 | 6/2013 | Peretz et al. |
| 2014/0040206 A1* | 2/2014 | Ramakrishnan .... G06F 11/2097 707/640 |
| 2014/0101100 A1 | 4/2014 | Hu et al. |
| 2014/0208028 A1 | 7/2014 | Coronado et al. |
| 2014/0236891 A1 | 8/2014 | Talius et al. |
| 2014/0297588 A1 | 10/2014 | Babashetty et al. |
| 2017/0177658 A1* | 6/2017 | Lee ..................... G06F 11/1451 |
| 2017/0220424 A1 | 8/2017 | Doshi et al. |

(Continued)

*Primary Examiner* — Michael Maskulinski
(74) *Attorney, Agent, or Firm* — Robert C. Kowert; Kowert, Hood, Munyon, Rankin & Goetzel, P.C.

(57) ABSTRACT

Systems and methods are disclosed to implement a synchronous database mirroring technique using delayed visibility write operations. In embodiments, a durable log of write operations in a primary database is replicated to a secondary database. The two databases do not make corresponding operations durable in a synchronous manner. However, the two databases coordinate to provide a visible view of the two durable logs that is guaranteed be durable in both databases. In embodiments, the primary database may monitor the state of the durable log of the secondary database, and periodically update the visible range of the logs to include operations that have been made durable in both databases. Advantageously, the visible range of the logs is permitted to grow asynchronously from the logs themselves, so that the two databases can provide a synchronized visible view of the log data without placing timing constrains on the data's durability.

20 Claims, 9 Drawing Sheets

(56) References Cited

U.S. PATENT DOCUMENTS

2017/0344618 A1 11/2017 Horowitz et al.
2018/0232412 A1* 8/2018 Bensberg ............ G06F 11/1464
2018/0246928 A1 8/2018 Kim et al.
2020/0145480 A1 5/2020 Sohail et al.

* cited by examiner

SYNCHRONOUS DATABASE GEO-MIRRORING USING DELAYED VISIBILITY WRITE OPERATIONS

BACKGROUND

Distribution of various components of a software stack can, in some cases, provide (or support) fault tolerance (e.g., through replication), higher durability, and less expensive solutions (e.g., through the use of many smaller, less-expensive components rather than fewer large, expensive components). However, databases have historically been among the components of the software stack that are least amenable to distribution. For example, it can be difficult to distribute databases while still ensuring the so-called ACID properties (e.g., Atomicity, Consistency, Isolation, and Durability) that they are expected to provide.

While most existing relational databases are not distributed, some existing databases are "scaled out" (as opposed to being "scaled up" by merely employing a larger monolithic system) using one of two common models: a "shared nothing" model, and a "shared disk" model. In general, in a "shared nothing" model, received queries are decomposed into database shards (each of which includes a component of the query), these shards are sent to different compute nodes for query processing, and the results are collected and aggregated before they are returned. In general, in a "shared disk" model, every compute node in a cluster has access to the same underlying data. In systems that employ this model, great care must be taken to manage cache coherency. In both of these models, a large, monolithic database is replicated on multiple nodes (including all of the functionality of a stand-alone database instance), and "glue" logic is added to stitch them together. For example, in the "shared nothing" model, the glue logic may provide the functionality of a dispatcher that subdivides queries, sends them to multiple compute notes, and then combines the results. In a "shared disk" model, the glue logic may serve to fuse together the caches of multiple nodes (e.g., to manage coherency at the caching layer). These "shared nothing" and "shared disk" database systems can be costly to deploy, complex to maintain, and may over-serve many database use cases.

A copy of a database, such as a read replica, may be updated in order to scale out access to a database (e.g., read processing). For example, as changes are made to the structure of the database, a SQL record may be created in a logical replication log which may then be propagated to all the replicas. A database engine for a copy of the database could then run these SQL statements locally on the copy of the database. Replicating changes in this way, however, can cause significant performance issues, especially when data is replicated over large distances. Therefore, techniques are generally needed to improve the performance and usability of these replicated databases.

Figure 1:
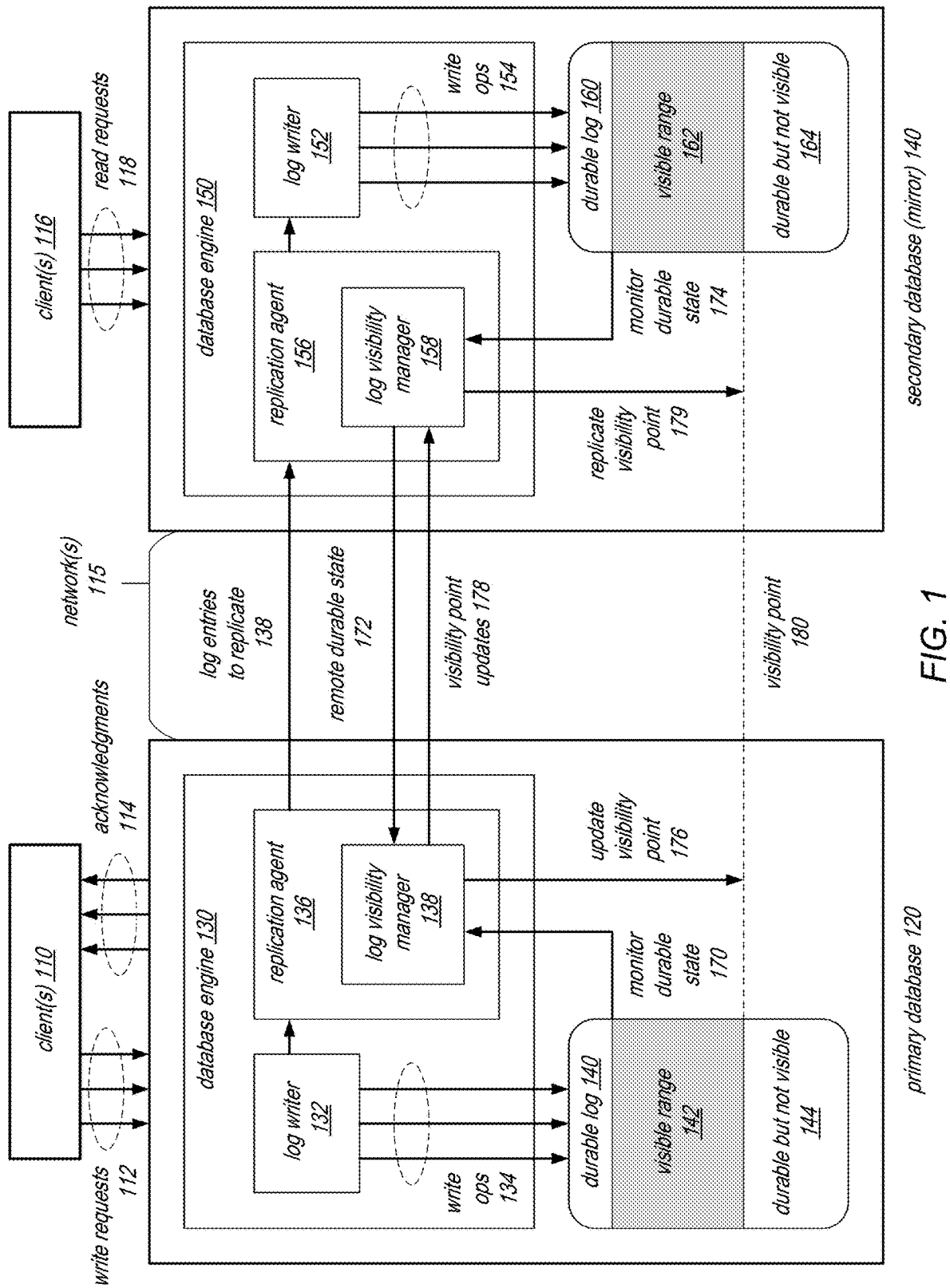
FIG. 1 is a block diagram illustrating an example synchronous database mirroring system implemented using delayed visibility write operations, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Systems and methods described herein may be employed in various combinations and in embodiments to implement a synchronous database mirroring system using delayed visibility write operations.

The replication or mirroring of databases over geographically distant locations (i.e., geo-mirroring) have many use cases in modern computer systems. Database geo-mirroring solutions ensure high availability in case of site failures. For performance reasons, database mirroring is frequently done asynchronously. This means that, normally, there is no bound on how far behind a mirror (or secondary) database can be in terms of durable user data when compared to the primary database. This difference in the durable states between the primary database and the secondary database may be referred to as "mirror lag." When the primary and secondary databases are constrained to have a mirror lag of zero, the secondary database may be said to be a synchronous mirror of the primary database.

Geo-mirroring involves database mirroring over wide area networks (WANs). WANs present various challenges to database mirroring, due to their high latencies, bandwidth constraints, and unpredictable network conditions. One straightforward implementation of synchronous mirroring over WANs is to use a "ping-pong" mirroring scheme, where the mirroring is implemented in terms of a back-and-forth messaging protocol to ensure that the mirror is lockstep behind the primary. However, this scheme generally results in unacceptably low performance of synchronous mirroring over WANs, making it unusable with any realistic, non-trivial database write workload. In another approach, synchronous mirroring can be implemented over metropolitan area networks (MANs), where maximum physical distance limits are imposed between a primary and its secondary database(s). However, the distance constraint excludes many use cases that require mirroring over large distances.

To address these and other problems with conventional database geo-mirroring systems, synchronous database mirroring techniques are disclosed herein using delayed visibility write operations. In contrast with many conventional systems, synchronous database mirrors implemented as described herein does not require the primary and secondary databases to make operations durable in lockstep, and is not subject to any maximum distance limits between the primary and the secondary database.

In embodiments of the synchronous mirroring systems described herein, synchronous mirroring is realized by separating the persisting of user data writes to storage at the primary database from the data's visibility and retention, without forcing the mirror to be in lockstep with the primary database in terms of their locally durable states. Instead, the two databases provide their clients a subset of their durable state as the visible data, to provide the illusion that they are in lockstep. Thus, during normal operation, the primary database's durable state can be ahead of its mirror in terms of user writes, or vice versa. However, the primary database shows only a subset of what is successfully written to the primary storage to its clients. In some embodiments, only user writes that have been made durable at all databases in the group of mirrored databases (i.e., the mirror group) are made visible at the clients. When the primary database restarts or fails (causing it to failover to another database at another geographic location), only the visible data is retained in the mirror group. User writes that have not been made visible are discarded or invalidated. Accordingly, the visibility of durable writes are delayed to ensure the correctness of synchronous mirroring with respect to the visible data.

In some embodiments, the primary and secondary databases may store client write operations in respective database logs, before they are applied to the underlying tables. In some embodiments, the synchronous mirroring may be implemented on the respective logs of the primary and secondary databases. Due to actual mirror lag, the two logs may reflect different durable states at any given time. However, in some embodiments, the primary database may implement a monitoring component to monitor the durable state of the secondary database's log. The primary database may periodically compare the durable, highest in-sequence log entry in its own log and the mirror's log to determine the latest common durable state in both databases. The primary database may then update a visibility point to enlarge a visible range of the two logs to include the latest common durable state of the two databases. Only the effect of those log entries or write operations in the visible range are made visible to database clients. Accordingly, the clients are presented with the illusion of synchronous mirroring between the two databases.

In some embodiments, the visibility point may be periodically determined by the primary database, and then broadcast to all of its secondary databases, so that all of the secondary databases can share the same notion of visibility. In some embodiments, the primary and its secondary databases may update their visibility points synchronously using a synchronous protocol, so as to maintain a synchronized visible range of their respective logs. In some embodiments, a client request for a write operation may be acknowledged only when the write operation becomes visible. The acknowledgement may be synchronous to the request or asynchronous to the request.

In some embodiments, the synchronous mirroring technique may be provided as a configurable setting for remote mirrors. In some embodiments, a single primary database may be configured to support multiple remote mirrors, some of which are synchronous in terms of their visibility, and some that are not. In some embodiments, a synchronous mirroring option may be one of multiple mirror configuration options provided by a database system to mitigate the effects of mirror lag. For example, in some embodiments, the database system may provide a configurable parameter to limit the lag of a mirror to a maximum threshold. In some embodiments, a particular database mirror may be configured implement both synchronous mirroring and also a maximum mirror lag.

As may be appreciated by those skilled in the art, the synchronous mirroring techniques disclosed herein improve the functioning of database systems that implement geo-mirroring to provide at least some of the following technical benefits. In one respect, by separating the durability of the write operations from their visibility, the primary and secondary databases are allowed to make write operations durable at their own pace, without being constrained by mirror lag rules or the requirements of synchronous write protocols, etc. Unlike in most synchronized write protocols, in the described approach, durability of a write at the primary does not have to wait for an earlier write to be made durable at the mirror. Instead, the writes may be made durable in a "pipelined" approach, where they can be persisted at each database in the mirror group independently. This pipelining of write operations within the mirror group dramatically improves the performance of synchronized mirroring.

In another respect, the disclosed synchronous mirroring techniques do not impose any distance limits or expose significant effects of mirror lag to the clients. The secondary database mirror may be located far away from the primary database, and the distance between the two does not impact the correctness of the mirroring process. The clients do not actually perceive the mirror lag, because they only see the visible subset of the data that has been made durable everywhere. From the writer client's perspective, there is only a small delay in the acknowledgement of their write operations. In some applications, these delays in acknowledgement do not result in any significant impacts on the user experience. Of course, in some embodiments, the synchronous mirroring system may be configured to provide explicit signals about mirror lag to those clients who wish to receive them.

In yet another respect, the disclosed synchronous mirroring techniques do not require extensive modifications to the existing replication protocol of the database mirror system, which may be difficult or impossible to change. Rather, the synchronous mirroring techniques may be implemented on top of the underlying replication protocol, by adding a monitoring of the mirror's durable state and a small amount of metadata to control the data's visibility. These features allow the synchronous mirroring techniques to be easily implemented as an add-on or configurable component of a legacy database mirroring system, without altering the existing replication protocol. These and other features and benefits of the synchronous database mirroring system are described in further detail below, in connection with the figures.

FIG. 1 is a block diagram illustrating an example synchronous database mirroring system implemented using delayed visibility write operations, according to some embodiments.

As shown, in some embodiments, the synchronous database mirroring system may include two database systems, a primary database 120 and a secondary database 140, which is acting as a mirror of the primary database 120. In other examples, the synchronous database mirroring system may include more than two database systems (e.g., multiple primary databases or secondary databases). In some embodiments, the secondary database 140 may be implemented as a read-only database. In some embodiments, the secondary database 140 may be configured to replicate only a portion of the data held in the primary database 120.

In some embodiments, the two databases 120 and 140 may be implemented across two different physical locations or regions (e.g. two different sites or cities). In some embodiments, each location may correspond to a different location (e.g. a data center or availability zone) within a distributed system. In some embodiments, each location may be a distinct network (e.g. a local area network or LAN) that are connected to the other network locations, but whose network elements are not generally accessible outside of the network. As shown, the two databases may be connected via one or more networks 115. In some embodiments, the network(s) 115 may be a wide area network or WAN, which can span large physical distances. In some embodiments, the network(s) 115 may be implemented over a public network, such as the Internet.

The client(s) 110 and 116 of the two databases may encompass any type of client configurable to submit database requests to the databases 120 and 140. In some embodiments, a client 110 or 116 may include one or more components configurable to issue database read 118 and write requests 112 (e.g. in the form of Structured Query Language or SQL statements) to the databases. As shown, in this example, clients 110 are able to issue write requests 112 to the primary database 120, which is writable. However, clients 116 only issues read requests 118 to the secondary database 140, which is a read-only mirror. In some embodiments, the clients may implement a specialized protocol to interact with an application programming interface or API provided by the databases. As shown, in this example, the database 120 may provide acknowledgements 114 to the write requests 112 via its client interface, which may acknowledge whether individual write requests 112 are successful or not. In some embodiments, the databases may provide client interfaces that are network-based, so that client requests are received over the network, such as the network 115.

As shown, in some embodiments, the databases 120 and 140 may implement respective database engines 130 and 150. The database engines 130 and 150 may implement the core functionality of the database system, such as executing read and write operations on the data managed within the database system. As shown, in this example, the databases 120 and 140 may be log-based, where write operations (e.g. operations 134 and 154) are persistently stored to a durable log (e.g. logs 140 and 160). In some embodiments, the durable log may store individual write operations in sequence, in the order that they are added. In some embodiment, each log entry may indicate a log sequence number or LSN, which uniquely identifies a log entry and its relative place in the sequence with respect to other log entries. As shown, in this example, the durable logs 140 and 150 may be written by respective log writer components 132 and 152 that are implemented by the database engines 130 and 150. In some embodiments, a write operation is deemed locally durable when it is stored or added to the durable log. In some embodiments, the log may be used to store individual transactions, which may include multiple write operations that are logically grouped together and performed in an all-or-nothing fashion. In that case, each individual transaction will be considered durable when it is committed to the durable log. Because the contents of the durable log are stored on some persistent storage, the contents will survive and power cycle of the database or failure of server(s) hosting the database. In some embodiments, the contents of the durable log may later be applied to the underlying database objects (e.g. tables) by playing the logged write operations or transactions in the log sequence order. In some embodiments, the playing of the logged operations may be performed lazily or asynchronously from the client requests 112.

As shown, in this example, the database engines 130 and 150 may implement respective replication agents 136 and 156. Depending on the embodiment, the respective replication agents may be implemented outside the database engine 130 and 150, or as part of the log writers 132 and 152. In some embodiments, the replication agents 136 and 156 may be configured to interact with one another over the networks 115, to implement the mirroring or replication of data to the secondary database 140. The two replication agents 136 and 156 may be configured to perform different functions, where one agent (e.g. agent 136) acts as the sending agent that sends data to be replicated, and the other agent (e.g. agent 156) acts as the receiving agent that receives the data to be replicated. For example, in some embodiments, the replication agent 136 may implement coordinating functionalities as a replication server component, while the replication agent 156 may implement only local functions as a replication agent component. In some embodiments, a replication agent may be configured to perform both the sending and receiving of replication data.

As shown, in this example, the replication agents implement a replication protocol where the sending agent 136 sends log entries 138 to the receiving agent 156, to replicate all write operations logged to the durable log 140 in the primary database to the corresponding durable log 160 of the secondary database 140. The log entries may be sent in sequence, or in some embodiments, in a manner where the receiving agent 156 can reproduce the log sequence (e.g. using the log entry LSNs). As shown, the receiving agent 156 may invoke the log writer 152 to append received log entries or write operations to the durable log 160.

As may be understood, because the network(s) 115 may span large distances (and due to a host of other factors), the durable log 160 of the secondary database may lag the durable log 140 of the primary database. In some embodiments, the converse may be true, where the durable log 160 may be in a more advanced state than the durable log 140 (or at least include some data that is not yet persistent in log 140). Thus, at any given time, the durable states of the two logs 140 and 160 may be different. As discussed, this divergence between the two logs create a risk of data loss in the database mirroring system. For example, if the primary database 120 fails when its log is in a more advanced state than the corresponding log on the mirror, a failover to the mirror will not guarantee the recovery of the full durable state of the primary's log.

Accordingly, in some embodiments, the replication agents 136 and 156 may implement respective log visibility manager components 138 and 158, to mitigate this risk of data loss caused by the mirror lag. In some embodiments, the log visibility manager 138 and 158 may be implemented separate from and outside of the replication agents 136 and 156. In some embodiments, the log visibility managers may be implemented separate from and outside of the database engines 130 and 150.

In some embodiments, the log visibility managers 138 and 158 may be implemented as a pair of processes or threads that are configured to communicate with one another. The two visibility managers may implement different functionalities. The visibility manager 138 on the primary database may be configured to obtain 172 the durable state of the remote durable log 160 on the secondary database. The primary visibility manager 138 may also monitor 170 the durable state of its own durable log 140. Based on the durable state of the logs 140 and 160, the primary visibility manager 138 may periodically update 176 a global visibility point 180 for both logs. As shown, the secondary log visibility manager 158 may locally monitor 174 the durable state of the durable log 160, and provide 172 the durable state to the primary log visibility manager 138. In some embodiments, remote durable state 172 of the secondary database log may be provided as part of a continuous stream of information from the secondary database. In some embodiments, the stream may be specified as part of the replication protocol implemented by the replication agents 136 and 156, which may specify the exchange a different types of state information about the two databases 130 and 150.

In some embodiments, the primary database's replication agent 136 controls the global visibility point 180 for the secondary database (e.g. the mirror database), and all other synchronous mirror databases following the primary database. The visibility point 180 may be updated in a manner so that a log entry (or write operation) is made visible only when this log entry operation has been made durable (e.g. added to the durable log) at all synchronous mirror databases of the primary database. Thus, when all mirror databases (e.g. the secondary database 140) report that they have durably performed or durably logged a particular write operation, the primary database is permitted to advance the visibility point 180 to include that particular write operation in the visible range. Depending on the embodiment, visibility manager 138 may update the visibility point 180 continuously, or periodically (e.g. every 5 seconds), based on the occurrence of specific conditions (e.g. every 100 log entries written to the durable log), or as a result of either. In some embodiments, the timing of the visibility point update may be configurable via a configuration interface of the primary database 120.

As shown, the visibility point 180 defines a visible range 142 in the durable log 140, and a set of durable but not visible log entries 144 in the durable log 140. In some embodiments, the visibility point may simply refer to an LSN that is the last log entry in the log 140 that is deemed to be visible. Likewise, the visibility point 180 also defines a visible range 162 and a durable but not visible set of log entries in the durable log 160 of the secondary database, and also the durable logs of all other database mirrors associated with the primary database. In some embodiments, logged operations not in the visible range are not accessible by local clients of the database. For example, clients 110 may not be able to immediately see the effects a logged operation in the range 144, even though the operation has already been durably logged. In some embodiments, a logged operation in the range 144 may not be applied to the underlying tables until it moves to the visible range 142. In some embodiments, a client write request 112 that requested the write operation is not acknowledged 114 until the write operation is moved to the visible range 142. Accordingly, until a write operation is made globally durable at all synchronous mirrors, the write operation is not visible to any clients. In some embodiments, logged operations in the durable but not visible range 144 are kept in an indeterminate state, so that in the event of a recovery from failure, any logged operations not in the visible range are invalidated or truncated as if they were never made durable.

In some embodiments, the visibility point 180 (and thus the visible ranges 142 and 162) may be kept synchronized (or within a small lag tolerance) across all synchronous mirror databases of the primary database 120. Accordingly, the primary database and its mirror databases will present a synchronized (or near-synchronized) visible view of their durable state. As shown, in some embodiments, this synchronization may be implemented by the replication agent 136 broadcasting 178 any visibility point updates to the mirror databases (e.g. secondary database 140). As shown, the log visibility manager 158 of the secondary database may receive the update, and replicate 179 the update on its own visibility point to match the visibility point on the primary database.

In some embodiments, there is no requirement on when the secondary database will update its own visibility point. That is, the secondary database may advance its visibility point to match the primary database, at any time after the primary database has updated its visibility point. However, in some embodiments, the primary and secondary databases may implement an additional update their visibility points in a synchronous manner, so that log records or write operations become visible at both databases at a single logical point in time. For example, in some embodiments, the two databases may implement a two-phase protocol to "prepare" for, and the "commit" a change to the visibility point, so that the change is performed everywhere in an all-or-thing manner. As another example, in some embodiments, the primary and secondary databases may share a synchronized clock, and the visibility point broadcast message 178 may instruct all mirror databases to update their respective visibility point at a synchronized time point in the future (e.g. at the next minute boundary).

In the described manner, the primary and secondary databases are allowed grow its durable state at its own independent pace. However, by separating the local durability of writes from their visibility, databases are freed from the timing constraints on their write operations imposed by other mirroring protocols, providing the illusion that there is no mirror lag at all. For example, a write operation can be made durable at the primary database without waiting for confirmation that a previous write operation has been made durable at all of the mirror databases. Rather, write operations can be made durable in a more relaxed or "pipelined" manner, where each database in the mirror configuration can persist durable state at its own independent pace, with the understanding that some not-yet-visible writes made locally durable may possibly be invalidated.

Figure 2:
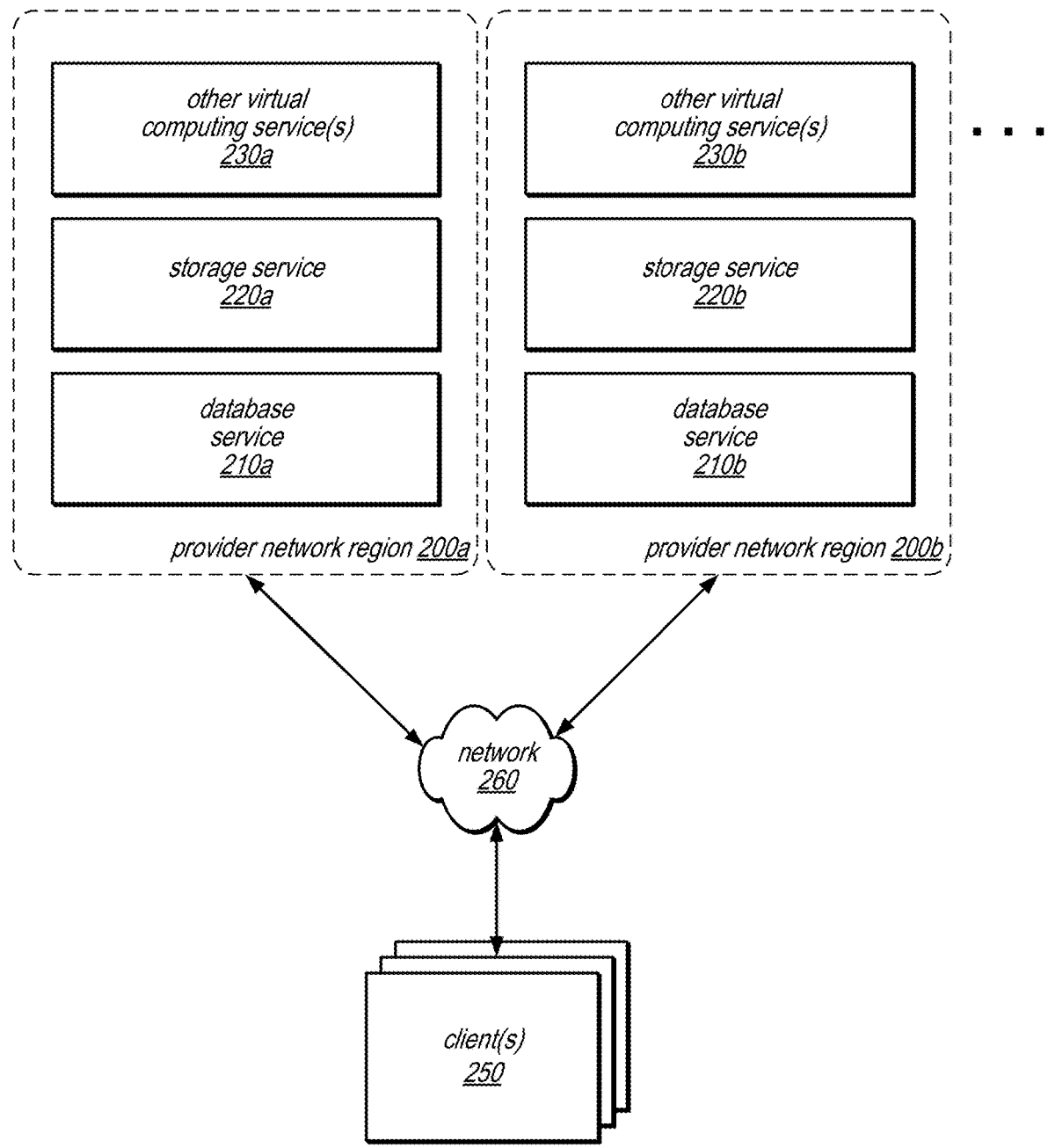
FIG. 2 is a block diagram illustrating provider network regions that implement synchronous database mirrors using delayed visibility write operations, according to some embodiments.

FIG. 2 is a block diagram illustrating provider network regions that implement synchronous database mirrors using delayed visibility write operations, according to some embodiments.

In some embodiments, a provider network may be a private or closed system or may be set up by an entity such as a company or a public sector organization to provide one or more services (such as various types of cloud-based storage) accessible via the Internet and/or other networks to clients 250, in some embodiments. The provider network may be implemented in a single location or may include numerous provider network regions, such as provider network regions 200a, 200b, and so on, that may include one or more data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network within the provider network regions 200. Provider network regions 200 may, in some embodiments, be isolated from other provider network regions. In the illustrated embodiment, a number of clients (shown as clients 250 may interact with a provider network region 200 via a network 260. Provider network regions 200 may implement respective instantiations of the same (or different) services, a database services 210a and 210b, a storage services 220a and 220b and/or one or more other virtual computing services 230a and 230b. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

In some embodiments, the clients 110 and 116 of FIG. 1 may be implemented as a client 250 as described below. Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with network-based services platform 200. In some embodiments, client 250 may generate network-based services requests according to a Representational State Transfer (REST)-style web services architecture, a document- or message-based network-based services architecture, or another suitable network-based services architecture.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network region 200 may be coordinated by client 250 and the operating system or file system on behalf of applications executing within the operating system environment.

Clients 250 may convey network-based services requests to and receive responses from provider network region 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with provider network region 200 using a private network rather than the public Internet. For example, clients 250 may be provisioned within the same enterprise as a database service system (e.g., a system that implements database service 210 and/or storage service 220). In such a case, clients 250 may communicate with platform 200 entirely through a private network 260 (e.g., a LAN or WAN that may use Internet-based communication protocols but which is not publicly accessible).

Generally speaking, provider network region 200 may implement one or more service endpoints may receive and process network-based services requests, such as requests to access data pages (or records thereof). For example, provider network region 200 may include hardware and/or software may implement a particular endpoint, such that an HTTP-based network-based services request directed to that endpoint is properly received and processed. In one embodiment, provider network region 200 may be implemented as a server system may receive network-based services requests from clients 250 and to forward them to components of a system that implements database service 210, storage service 220 and/or another virtual computing service 230 for processing. In other embodiments, provider network region 200 may be configured as a number of distinct systems (e.g., in a cluster topology) implementing load balancing and other request management features may dynamically manage large-scale network-based services request processing loads. In various embodiments, provider network region 200 may be may support REST-style or document-based (e.g., SOAP-based) types of network-based services requests.

In addition to functioning as an addressable endpoint for clients' network-based services requests, in some embodiments, provider network region 200 may implement various client management features. For example, provider network region 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network region 200 may also implement financial accounting and billing systems, or may maintain a database of usage data that may be queried and processed by external systems for reporting and billing of client usage activity. In certain embodiments, provider network region 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network region 200 may also implement user authentication and access control procedures. For example, for a given network-based services request to access a particular database table, provider network region 200 ascertain whether the client 250 associated with the request is authorized to access the particular database table. Provider network region 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region 200 to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region 200 may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
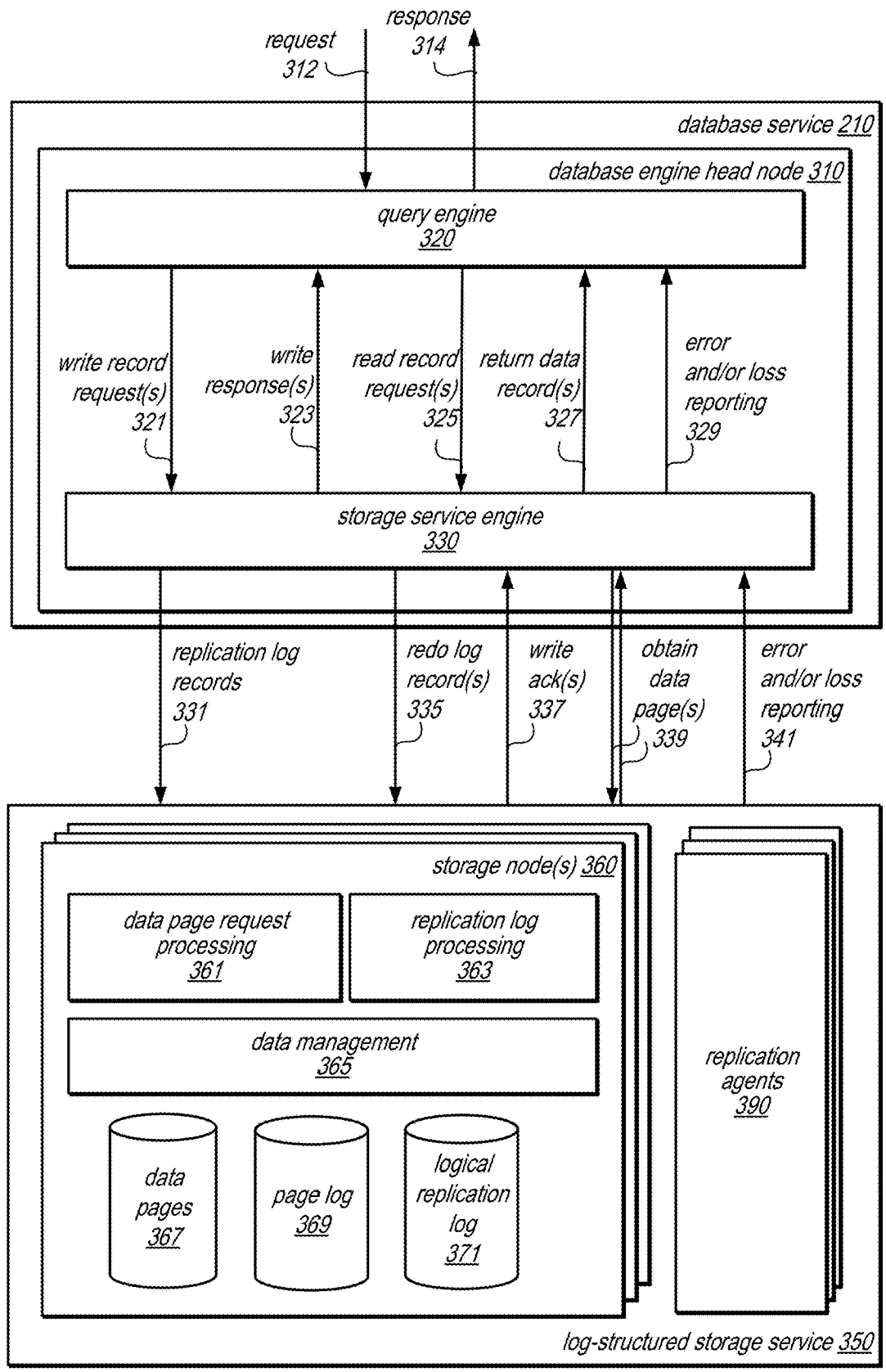
FIG. 3 is a block diagram illustrating components of a database service and storage service that may be used to implement synchronous database mirroring with delayed visibility write operations, according to some embodiments.

FIG. 3 is a block diagram illustrating components of a database service and storage service that may be used to implement synchronous database mirroring with delayed visibility write operations, according to some embodiments.

For example, in the example database system implemented as part of database service 210, a database engine head node 310 may be implemented for each of several databases and a log-structured storage service 350 (which may or may not be visible to the clients of the database system). Clients of a database may access a database head node 310 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a database engine head node 310.

In some embodiments, a database instance may include a single database engine head node 310 that implements a query engine 320 that receives requests, like request 312, which may include queries or other requests such as updates, deletions, etc., from various client programs (e.g., applications) and/or subscribers (users), then parses them, optimizes them, and develops a plan to carry out the associated database operation(s). Query engine 320 may return a response 314 to the request (e.g., results to a query) to a database client, which may include write acknowledgements, requested data pages (or portions thereof), error messages, and or other responses, as appropriate. As illustrated in this example, database engine head node 310 may also include a storage service engine 330 (or client-side driver), which may route read requests and/or redo log records to various storage nodes within log-structured storage service 350, receive write acknowledgements from log-structured storage service 350, receive requested data pages from log-structured storage service 350, and/or return data pages, error messages, or other responses to query engine 320 (which may, in turn, return them to a database client). In some embodiments, the log-structured storage service 350 may be configured to maintain the durable logs 140 and 160 of FIG. 1.

In this example, query engine 320 or another database system management component implemented at database engine head node 310 (not illustrated) may manage a data page cache, in which data pages that were recently accessed may be temporarily held. Query engine 320 may be responsible for providing transactions and consistency in the database instance of which database engine head node 310 is a component. For example, this component may be responsible for ensuring the Atomicity, Consistency, and Isolation properties of the database instance and the transactions that are directed that the database instance, such as determining a consistent view of the database applicable for a query, applying undo log records to generate prior versions of tuples of a database. Query engine 320 may manage an undo log to track the status of various transactions and roll back any locally cached results of transactions that do not commit.

FIG. 3 illustrates various interactions to perform various requests, like request 312. For example, a request 312 that includes a request to write to a page may be parsed and optimized to generate one or more write record requests 321, which may be sent to storage service engine 330 for subsequent routing to log-structured storage service 350. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) to database engine head node 310 (specifically to storage service engine 330). Storage service engine 330 may pass these write acknowledgements to query engine 320 (as write responses 323), which may then send corresponding responses (e.g., write acknowledgements) to one or more clients as a response 314.

In another example, a request that is a query may cause data pages to be read and returned to query engine 320 for evaluation and processing or a request to perform query processing at log-structured storage service 350 may be performed. For example, a query could cause one or more read record requests 325, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339 to database engine head node 310 (specifically to storage service engine 330). Storage service engine 330 may send the returned data pages to query engine 320 as return data records 327, and query engine may then evaluate the content of the data pages in order to determine or generate a result of a query sent as a response 314. As discussed below with regard to FIG. 4, some requests to store replication log records 331 may be performed as part of performing replication log techniques (e.g., to amortize the transmission of replication records to a replication log).

In some embodiments, various error and/or data loss messages 341 may be sent from log-structured storage service 350 to database engine head node 310 (specifically to storage service engine 330). These messages may be passed from storage service engine 330 to query engine 320 as error and/or loss reporting messages 329, and then to one or more clients as a response 314.

In some embodiments, the APIs 331-341 of log-structured storage service 350 and the APIs 321-329 of storage service engine 330 may expose the functionality of the log-structured storage service 350 to database engine head node 310 as if database engine head node 310 were a client of log-structured storage service 350. For example, database engine head node 310 (through storage service engine 330) may write redo log records or request data pages through these APIs to perform (or facilitate the performance of) various operations of the database system implemented by the combination of database engine head node 310 and log-structured storage service 350 (e.g., storage, access, change logging, recovery, and/or space management operations).

Note that in various embodiments, the API calls and responses between database engine head node 310 and log-structured storage service 350 (e.g., APIs 321-329) and/or the API calls and responses between storage service engine 330 and query engine 320 (e.g., APIs 331-341) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C # and Perl to support integration with database engine head node 310 and/or log-structured storage service 350.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, the redo log may be the durable log 140 and 160 of the database, as discussed in connection with FIG. 1. In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number or LSN), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, replication log processing 363, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request. Replication log processing 363 may handle requests to store replication logs to transaction objects and update replication logs stored in or associated with logical replication log 371. In some embodiments, the logical replication log 371 may be the durable logs 140 and 160, as discussed in connection with FIG. 1.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

In some embodiments, replication agents 390 may be implemented as part of log-structured storage service 350 or other storage service, as discussed above. In some embodiments, the replication agents 390 may implement the replication agents 136 of 156, as discussed in connection with FIG. 1. In some embodiments, log-structured storage service 350 may be multi-tenant storing data for different databases hosted on behalf of different user accounts (e.g., owned, operated, managed by different entities) by sharing resources at storage nodes, in some embodiments. Some replication agent(s) 390 may perform the below replication techniques for multiple different databases for different user accounts, in some embodiments.

Figure 4:
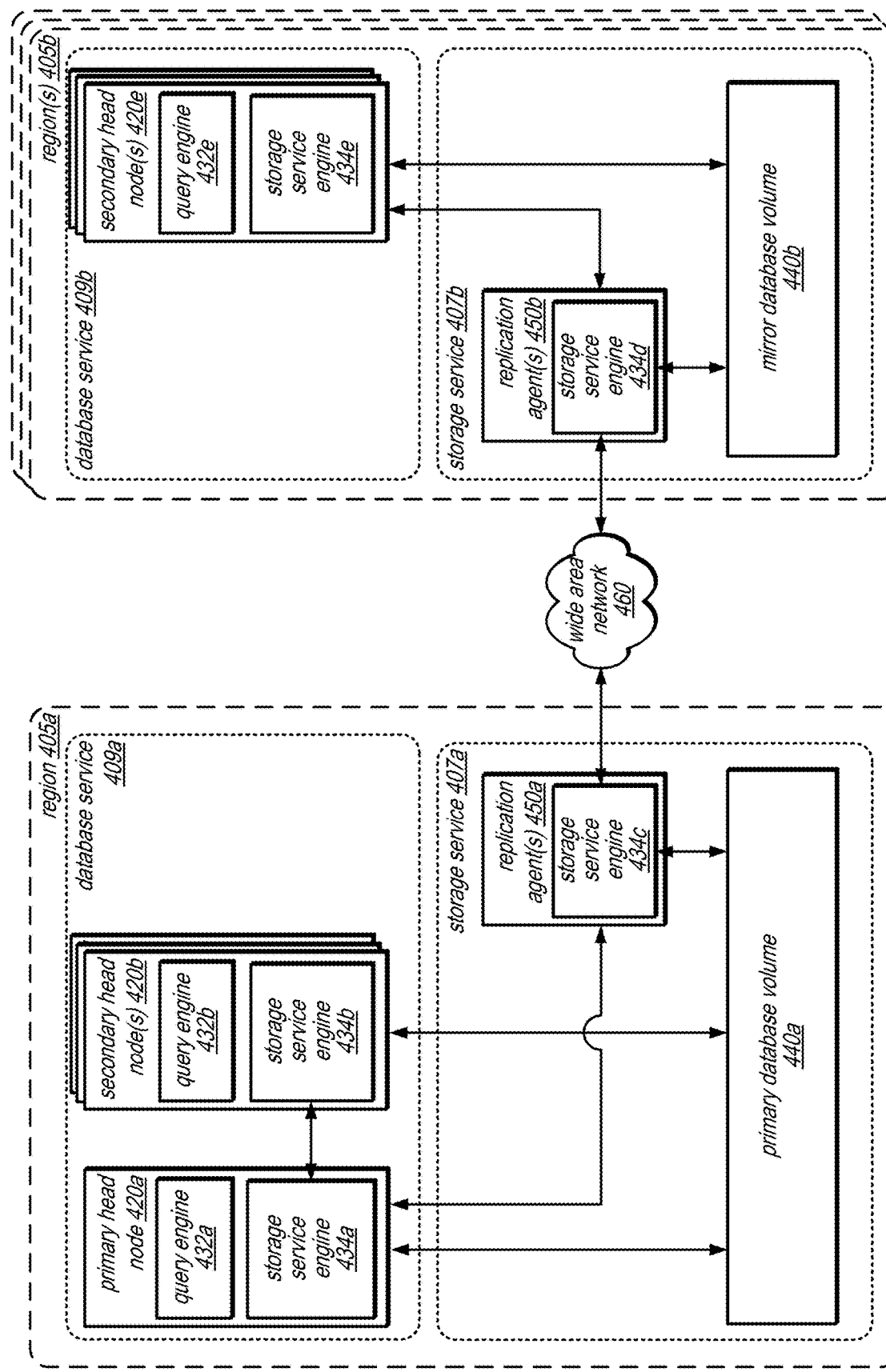
FIG. 4 is a block diagram illustrating components of a database service that may be used to implement replication to synchronous database mirrors using delayed visibility write operations, according to some embodiments.

FIG. 4 is a block diagram illustrating components of a database service that may be used to implement replication to synchronous database mirrors using delayed visibility write operations, according to some embodiments.

As shown, multiple clusters of one or more database engine head nodes may be hosted in respective services in database services 409a and 409b in region 405a and region(s) 405b to provides database services to clients that access the databases in the different regions. It should be noted that, while the illustrated example shows one remote cluster, any number of remote clusters may be employed. Similarly, one or multiple head nodes may be implemented within each database service for a database, in some embodiments Multiple head nodes, as discussed above with regard to FIGS. 2 and 3, such as primary head node 420a and secondary head node(s) 420b may be implemented as part of database service 409a to provide access to a database stored in storage service 407a, in primary database volume 440a. Primary head node 420 may provide read and write capabilities to the database, utilizing database tier 432a and client-side storage service driver 434a, as well as offering additional read capacity via secondary head node(s) 420b, which includes a respective database tier 432b and client-side storage service driver 434b.

Storage service 407a may also implement a replication agent(s) 450a which may act as a reverse proxy, among other features, to replicate changes made to the database at primary database volume 440a to a mirror database volume 440b stored in storage service 407b in region 405b. Note that other regions may also implement mirror database volumes in respective storage services. In some embodiments, replication agents 450a and 450b may be used to implement replication agents 136 and 156, respectively, as discussed in connection with FIG. 1. Replication agent(s) 450a may implement a client-side storage service driver 434c to perform the various functionalities for replicating data from the primary database volume 440a to the mirror database volume 440b. Similarly, storage service 407b may implement replication agent(s) 450b, which may include a client-side storage service driver 434d to perform the replication techniques to the mirror database volume 440b while minimizing the time that mirror database volume is unable to be accessed by secondary head node 420e (via database tier 432e and client-side storage service driver 434e), in some embodiments. In some embodiments, multiple replication agents may be assigned to replicating changes to database copies (e.g., two replication agents for source database and database copy).

In some embodiments, client-side storage service drivers 434 may implement a one or more streams of information to assist in synchronizing updates between database volumes and head nodes. For example, client-side driver 434a may send change notifications of cache invalidation messages, and/or changes to system metadata, such as data structures that indicate the layout and/or definition of the database and/or in-flight transaction data, such as the states of and entries of active transactions at primary node 420a to client-side driver 434b of replica node 420b as well as to client-side driver 434c of replication agent 450a. Replication agent(s) 450a can function as an additional replica node of the database in database service 409a, in some embodiments. Replication agent 450a may forward the change notifications received from the client-side driver 434a to the client-side driver 434d of the replication agent 450b over wide area network 460 (which may be a public network, in some embodiments) where the replication agent 450b may function as single writer for mirror database volume 440b. In this way, performance of the database in database service 409a is minimally degraded yet the access to mirror database volume 440b can provide a consistent read view of the database with minimal latency, in some embodiments.

As the communications between replication agents may occur over wide area network 460, various security protocols may be implemented. For example, SSL or other TLS security techniques may be implemented to safeguard or otherwise encrypt data being transmitted over wide area network 460 (e.g., log records or pages transmitted as part of the replication protocol).

Figure 5:
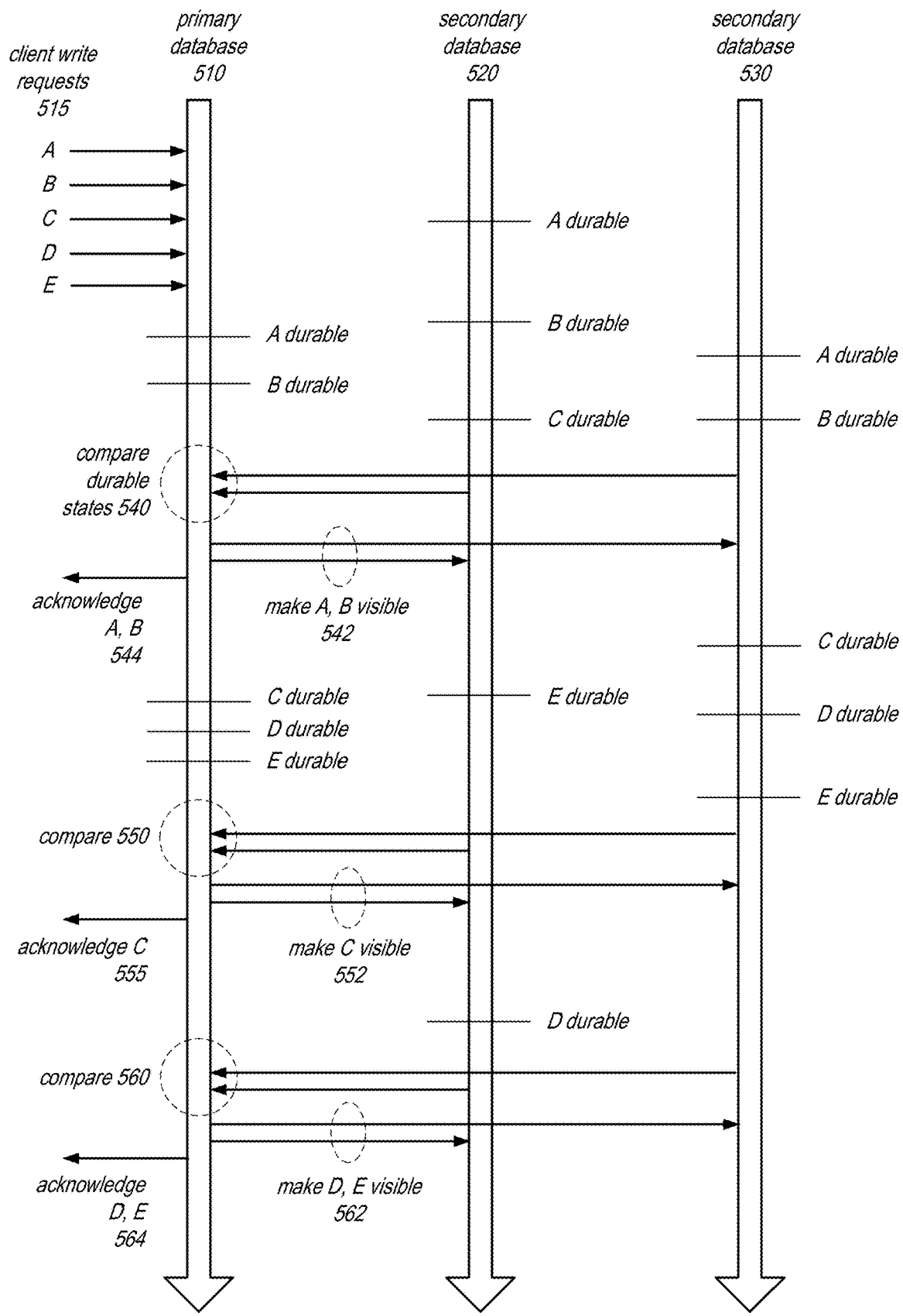
FIG. 5 is a timing diagram that illustrates events and interactions between a primary and two synchronous database mirrors using delayed visibility write operations, according to some embodiments.

FIG. 5 is a timing diagram that illustrates events and interactions between a primary and two synchronous database mirrors using delayed visibility write operations, according to some embodiments.

As shown in the figure, three timelines are shown for events occurring at three databases, a primary database 510, and two secondary databases 520 and 530, which are implemented as synchronous database mirrors as discussed previously. For example, primary database 510 may be primary database 120 of FIG. 1, and the secondary databases 520 and 530 may be the secondary database 140 of FIG. 1. It is noted that while only three databases are shown here, in different embodiments or configurations, other numbers of database (including multiple primary databases) may be implemented.

As shown, initially, a number of client write requests 515 (A, B, C, D, and E) are received at the primary database 510. As discussed, in some embodiments, only a primary database can receive and execute write requests, while secondary databases 520 and 530 are read-only. As shown, once the write requests are received, the primary database 510 will make the write operations durable, for example, by adding them in sequence to a durable log (e.g. durable log 140 of FIG. 1). As shown, in the timeline for primary database 510, each write operation is made durable at different times. Significantly, in some embodiments, even after the write operations are made durable, they may not be made immediately visible to clients. In some embodiments, the write requests themselves may not be acknowledged to the requesting client until after the primary database confirms that the requested operations are confirmed to be durable on all of the mirrors.

Also, in some embodiments, primary database 510 does not need to wait for confirmation from the mirrors that any previous operations have been made durable before making any operations durable at the primary database. That is, each database is allowed to make write operations durable asynchronously from the durable state of other databases, without being limited by any mirror synchronization constraints. This freedom to make operations durable independently at each database drastically improves the overall performance of the mirroring process. As shown, in this example, write operation B is made durable at the primary database 510 without any regard as to the durability status of previous write operations (e.g. operation A) at either of the secondary databases. Moreover, as shown in this example, write operation A is actually made durable at mirror database 520 before it is made durable at the primary database 510. In some embodiments, a mirror database may lead the primary database as a result of different conditions, such as for example an activity spike in the primary database.

As discussed previously in connection with FIG. 1, in some embodiments, the secondary databases may provide its durable state (e.g. the state of its durable log 160) to the primary database. In some embodiments, this durable state may be provided at the request of the primary database (e.g. by its replication agent). In some embodiments, the durable state may be pushed to the primary database without request from the primary database. In some embodiments, the secondary database may report its durable state periodically (e.g. once a minute). In some embodiments, the secondary database may provide its durable state based on asynchronous events, or in a continuous stream of state information. In some embodiments, the primary and secondary database may implement a bi-directional communication channel to continuously exchange state information needed for the synchronous mirroring protocol.

As shown, at operation 540, the primary database 510 compares the current durable states of itself and the two mirror databases 520 and 530. In some embodiments, the comparison may determine the lowest durable in-sequence LSN in all three of the databases. In some embodiments, a logged write operation is only considered durable if all preceding write operations (according to the LSN) have been made durable. In some embodiments, this lowest durable in-sequence LSN determined by the primary database becomes the new visibility point of all of the databases. Thus, in example, at point 540, because operations A and B have been made durable in all three databases, the visibility point is advanced to include operations A and B. In some embodiments, the primary database may update the visibility point periodically (e.g. once a minute), or based on asynchronous events (e.g. when its set of durable but invisible operations exceeds a threshold).

As shown, in this example, after the visibility point is updated, the primary database 510 may instruct 542 the two secondary databases 520 and 530 to update their respective visibility points to the same state. For example, the primary database may send two messages to the two mirror databases. In some embodiments, the primary database may be continuously broadcasting its durable state, including the state of its visibility point, to all of its synchronous mirrors, so that the mirrors can replicate the visibility point of the primary database (here, to make operations A and B visible).

In some embodiments, the propagation of the visibility point by the primary database may be done in a synchronous fashion, so that the update of the visibility point is synchronized across all three databases 510, 520, and 530. In some embodiments, the synchronization guarantees that clients of the three databases see the same visible state across all three databases. In some embodiments, to implement this synchronization, the instruction 542 to advance the visibility point may be understood to take effect at a synchronized time in the future, for example, at the next minute boundary at all of the databases. In some embodiments, the three databases may employ a two-phrase commit process to ensure that the visibility point is updated in an all-or-nothing fashion across the three databases.

In some embodiments, as shown, after write operations A and B are made visible, the primary database 510 acknowledges 544 the client requests that requested operations A and B. Thus, when a client request is acknowledged, the primary database guarantees that the requested operation has been made durable at all synchronous mirrors. In some embodiments, the acknowledgment may be synchronous with the request, meaning that the request will block (or not return) until the acknowledgement. In some embodiments, the acknowledgment may be asynchronous from the request. For example, the request may return immediately, and the primary database may send a subsequent notification or call back to the client when the requested operation becomes visible. In some embodiments, the primary database may provide no acknowledgment at all, and requested operations may simply become visible in the state of the primary database without any notification to the original requesting client.

As shown, at operation 550, the primary database again checks the durable states of all three databases. At this point, secondary database 520 has made durable operation E, but not operation D. This can occur in some embodiments, where write operations can get persisted in an order other than their sequence order. In some embodiments, write operation E is not considered durable in secondary database 520, because a preceding operation in the sequence order (operation D) is not yet made durable. Thus, the durable state of database 520 only extends to operation C. Accordingly, as shown, primary database 510 determines that the visibility point can only be advanced to operation C, and only operation C is made visible 552 and acknowledged 555. However, at operation 560, after operation D is finally made durable, the durable states of database 520 finally extends to operation E. Because all the durable state at all three databases now extend to operation C, after the compare operation 560, the primary database makes operations D and E visible 562, and acknowledges 564 operations D and E.

Figure 6:
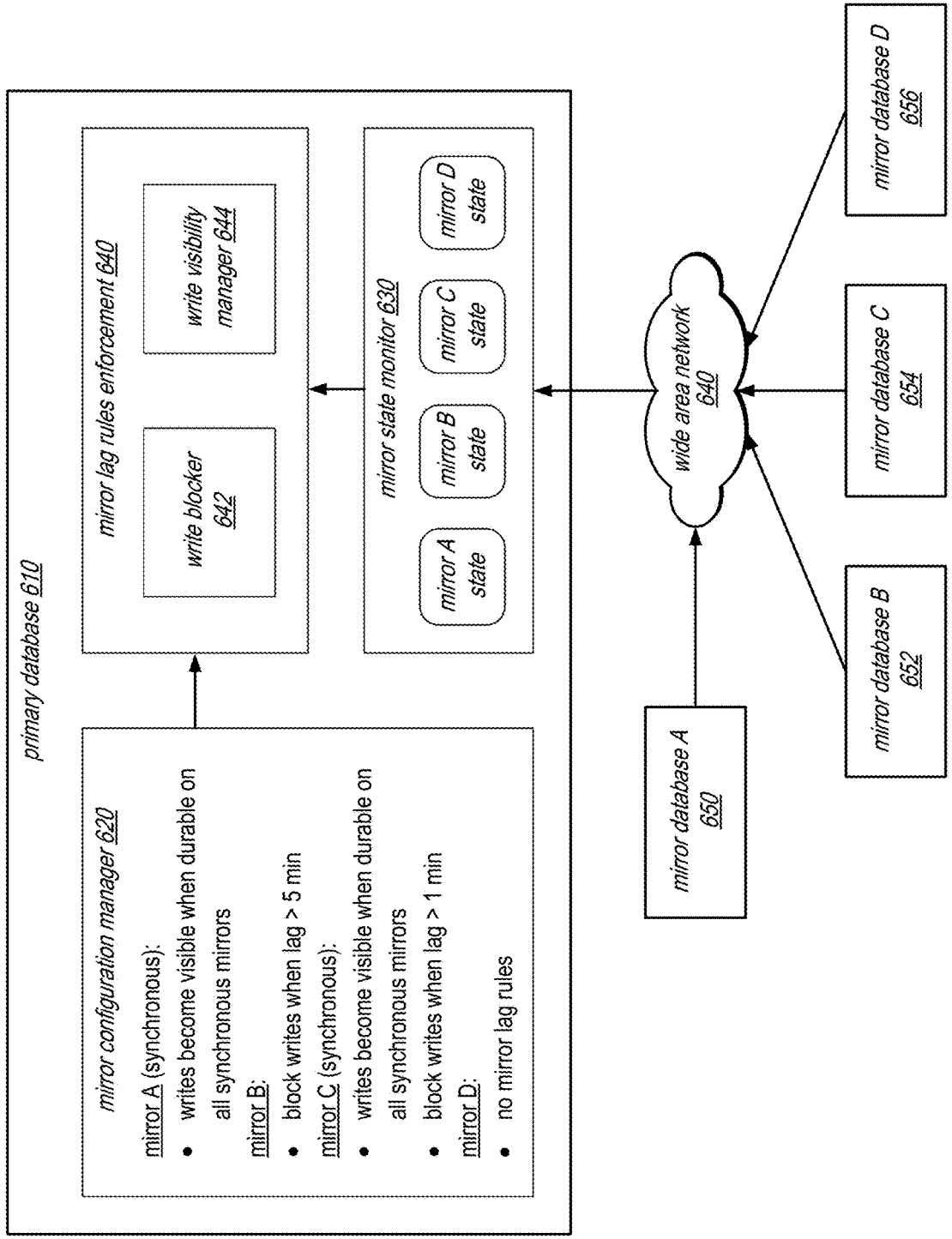
FIG. 6 illustrates components in a primary database system to configure and enforce mirror lag rules in the primary database, according to some embodiments.

FIG. 6 illustrates components in a primary database system to configure and enforce mirror lag rules in the primary database, according to some embodiments. In this example, the primary database 610 may be the primary database 120 of FIG. 1, and the mirror databases A 650 and C 654 may be configured as synchronous mirrors, such as the secondary database 140 of FIG. 1.

As shown, in some embodiments, the primary database 610 may implement a mirror configuration manager 620, which allows users or administrators to configure mirror lag rules for different mirror databases of the primary database. In some embodiments, this configuration manger 620 may present a graphical user interface, an API, or some other interface, that allows users or database administrators to specify a variety of configuration information about the mirror databases. In this example, the mirror lag rules of four different mirror databases (mirror A, B, C, and D) are shown.

As shown, all of these mirrors may replicate data from the primary database 610, which may be provided to the mirror databases over the WAN 640. To control the lag of these mirror databases to limit data loss, certain behavior of the primary database may be controlled according to the mirror lag rules. For example, as shown, mirror A 650 is specified to be a synchronous mirror. In particular, the mirror lag rule for mirror A provides that a database write to the primary database (and possibly all synchronous mirrors of the primary database) can only become visible when the write is durable on all synchronous mirrors (in this case mirror databases A 650 and C 654). In some embodiments, this configuration setting for synchronous mirroring may be implemented using the synchronous mirroring techniques discussed above.

In some embodiments, as shown, the primary database 610 may implement a mirror state monitor component 630, which may be configured to continuously monitor the state (e.g. the durable state) of the mirror databases. In some embodiments, these states are then used by the mirror lag rules enforcement component 640 to carry out various enforcement actions dictated by the mirror configurations. In some embodiments, the mirror state monitor 630 may be implemented by the replication agent 136 of log visibility manager 138, as discussed in connection with FIG. 1. In some embodiments, the mirror state monitor 630 may provide one process or thread for each mirror database A, B, C, and D to monitor each mirror database. In some embodiments, the mirror rules enforcement component 640 may implement a write visibility manager 644, which may implement the functionality of the log visibility manager 138 of FIG. 1.

As shown, mirror database B in this example is configured with a mirror lag rule that will block write operations at the primary database when a detected mirror lag for mirror B exceeds a threshold (e.g. 5 minutes). In some embodiments, the current mirror lag of the mirror database B may be determined from the mirror B state information monitored by the mirror state monitor 630. In some embodiments, a particular write operation or log entry may be tagged with a timestamp value when it is made durable, both at the primary database and at the mirror database. The difference of these two timestamp values may be monitored by the primary database 610, in order to enforce the mirror lag rule for mirror database B. In some embodiments, as shown, the mirror lag rules enforcement module 640 may implement a write blocker component 642, which may be configured to block or throttle further write operations to the primary database. In some embodiments, the blocking of write operations on the primary database may be accompanied or preceded by one or more warnings or indications to clients of the primary database, indicating to the clients that operations on the primary database may be blocked due to excessive lag in one of its mirror databases. Embodiments of the blocking technique to prevent mirror lag are described in further detail in co-pending U.S. patent application Ser. No. 16/587,777, which is herein incorporated by reference. In some embodiments, mirror databases that do not implement write visibility management (e.g. database mirrors B 652 and D 656) do not have any effect on the visibility point of the primary database 610.

In some embodiments, as shown, a mirror database (e.g. mirror C 654) may implement both types of mirror lag rules. In this case, mirror C will delay visibility of write operations until they are made durable on other synchronous mirrors, and also block write operations on the primary when the actual lag of the mirror exceeds some configurable limit (e.g. 1 minute). As may be understood, these constrains on the write operation handling behavior of the primary database enforced in conjunction with all the mirror lag rules for all mirrors of the primary database. In some embodiments, the mirror lag rules on a particular database may dynamically change based on its current role in the mirroring configuration. For example, in some embodiments, one remote mirror may be dynamically selected to be a near real time mirror, and impose tight mirror lag restrictions, while the other mirrors may impose relatively loose or relaxed mirror lag restrictions. In some embodiments, some of the mirrors (e.g. mirror database D) may impose no mirror lag restrictions at all. Such mirror databases may be maintained as "best effort" mirrors that is permitted to have very large mirror lags behind the primary database, without impacting the operations of the primary database.

As may be understood, the particular configuration of mirror lag rules on the mirror databases is something that is left to the user or database administrator. The option to use write visibility management may be the most performant option in some situations, because the primary database 610 is freed from any constraints on advancing its durable state. However, in some embodiments, if a synchronous mirror is severely lagging the primary database, clients of the database may experience long delays in when their writes become visible or when their write requests are acknowledged. The option to use write blocking may be more appropriate in some situations, for example where it is important for clients of the primary database receive explicit feedback as to the degree of mirror lag. In either case, the mirror lag rule may be used to implement a bound on the visible writes at both the primary and the secondary databases. In some embodiments, the mirror configuration manager 620 may implement an advisory system that recommends one or more mirror lag control options to the user, based on for example the various characteristics of the particular mirror, or various observed metrics of the particular mirror over time. In some embodiments, the configuration manager may automatically select particular mirror lag control options for a particular mirror, based on its characteristics or observed conditions.

It is noted that in some embodiments, a variety of different mirror lag control mechanisms may be implemented using shared components in the database system as basic building blocks. Accordingly, the database system may provide a large array of different database mirror configuration options to control the lag of different types of mirror databases.

Figure 7:
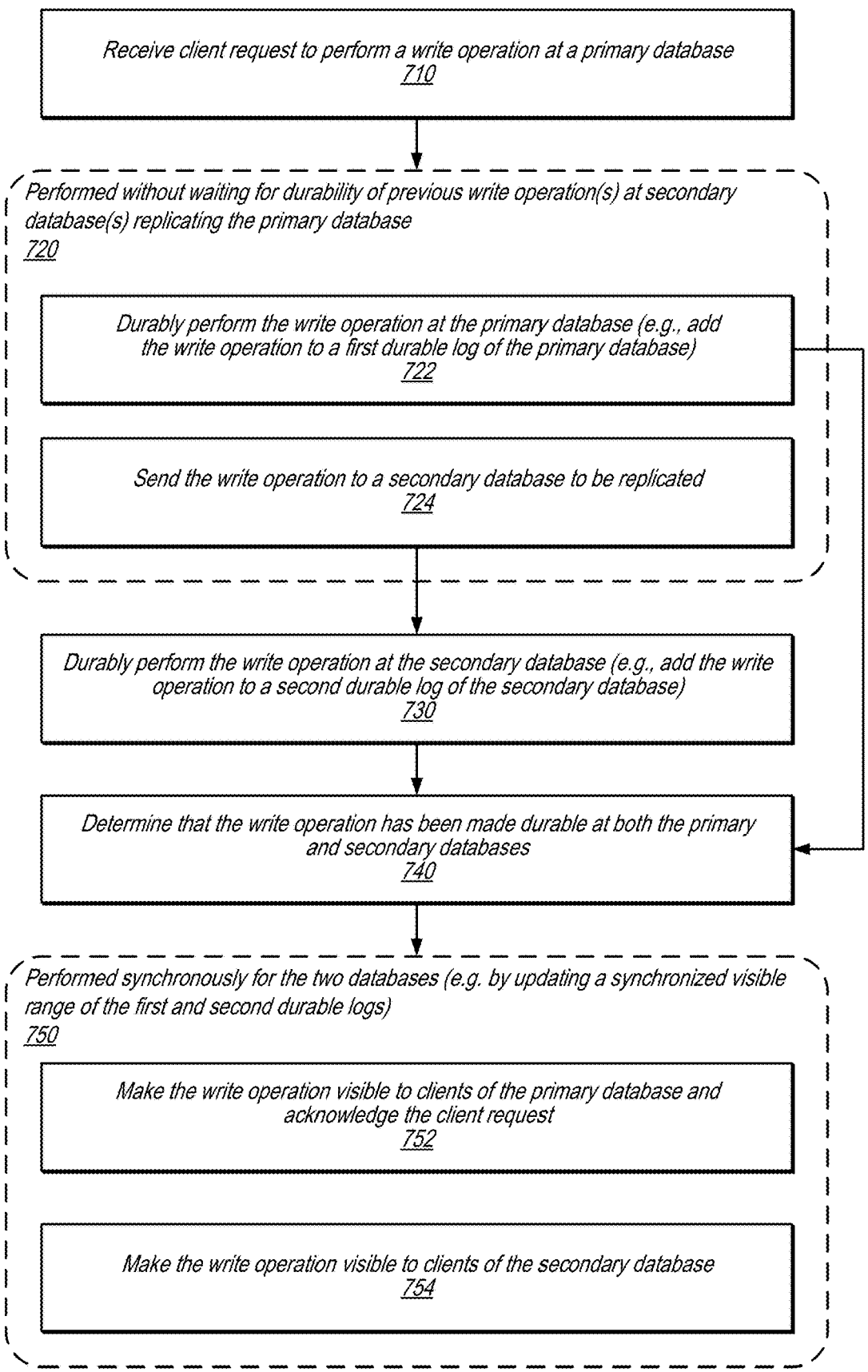
FIG. 7 is a flowchart illustrating a process of making a write operation durable and visible in a primary and a secondary database that implement synchronous database mirroring using delayed visibility write operations, according to some embodiments.

FIG. 7 is a flowchart illustrating a process of making a write operation durable and visible in a primary and a secondary database that implement synchronous database mirroring using delayed visibility write operations, according to some embodiments. The depicted process may be performed by the primary database 120 and the secondary database 140, as discussed in connection with FIG. 1.

At operation 710, a client request is received to perform a write operation at the primary database. In some embodiments, the client request may be received via a client interface of the primary database, such as a GUI or an API. In some embodiments, the client requests may be a transaction request that includes a number of write operations to be performed as an atomic unit. In some embodiments, the write operations may comprise lower level operations such as an update to a particular page maintained by the database.

As shown, operations 722 and 724 are part of a group 720 of operations performed by the primary database without waiting for the durability of previous write operations at any secondary database(s) replicating the primary database. As discussed, in some embodiments, one advantage of the delayed visibility approach is to separate the visibility of write operations and their durability, so that the actual durability (e.g. the persistent storing) of the write operations can be processed at each database independently, without being constrained by the durable state of other databases. This approach thus dramatically improves the write performance at the primary database and the performance of the mirroring process as a whole.

At operation 722, the write operation is durably performed at the primary database. For example, the write operation may be added to a first durable log of the primary database (e.g., the durable log 140) of FIG. 1. In some embodiments, the primary database may include a storage volume that stores the persistent data of the primary database, and also running a database instance that is executing on top of the storage volume. Thus, in some embodiments, to durably perform a write at the primary database, the write is persistently logged in or applied to the storage volume. In some embodiments, although the write operation is made durable, it is not made visible to clients of the primary database until a later time, when it is confirmed that the write operation is durable on all the synchronous mirrors. In some embodiments, writes that have not been made visible are not applied to the database tables, or acknowledged to the requesting client.

At operation 724, the primary database sends the write operation to a secondary database (e.g. a mirror database) to be replicated. The sending of the write operation may be performed according to a replication protocol implemented by the two databases. The sending may be performed at the initiative of the primary database (via a push mechanism), or at the request of the secondary database (via a pull mechanism). In some embodiments, the write operation may be sent in batches of log records. In some embodiments, the replication protocol may implement a continuous stream of logged operations to be provided to the secondary database.

At operation 730, the secondary database, after receiving the write operation, durably performs the write operation. For example, the write operation may be added to a second durable log (e.g. durable log 160) of the secondary database. In some embodiments, the secondary database may include a storage volume that stores the persistent data of the secondary database, and also running a database instance that is executing on top of the storage volume. Thus, in some embodiments, to durably perform a write at the secondary database, the write is persistently logged in or applied to the storage volume. As with the primary database, the durable performance of the write operation may not make the write operation immediately visible to clients of the secondary database. In some embodiments, a write operation that is not yet visible may not be applied to tables of the secondary database. In some embodiments, as the write operation may be made durable at the secondary database asynchronously from or without regard to the durable state of any other database in the mirror group.

At operation 740, a determination is made that the write operation has been made durable at both the primary and secondary databases. In some embodiments, this determination may be made at the primary database, which may obtain or monitor the durability state of the secondary database. In some embodiments, the monitoring may be performed by a component such as the replication agent 136 of FIG. 1, which may receive and examine periodic or continuous updates from the secondary database as to its durable state (e.g. the state of its durable log 160). In some embodiments, the determination may include comparing the current durable states of the primary database and all its secondary databases, and determining a visibility point that is the lowest point (e.g. log sequence number) of the highest in-sequence log entries from all of the databases in the group. The highest in-sequence log entry at a database represents the highest log entry that has been made durable at that database, and where all of its preceding log entries has been made durable at that database.

As shown, in this example, operations 752 and 754 is a group 750 of operations that is performed synchronously for the two databases. However, in other embodiments, the operations may be performed at different times at the two databases. In some embodiments, to perform operations 752 and 754 synchronously at the two databases, the two databases may implement a synchronous protocol to update the visibility point, so that the visibility point change at the two databases in the same logical point in time. This synchronous updating of the visibility point thus implements a synchronized visible window or range of log entries for the first and second durable logs on the two databases. For example, in some embodiments, the primary database may broadcast a new visibility point to all of its secondary databases, and all of the databases in the mirror group will then update to the new visibility point at an agreed-upon time (e.g. the next minute boundary). In some embodiments, the two databases may implement a two-phase commit protocol to ensure that the update is performed on all of the databases in the group, or none of the databases in the group.

At operation 752, the write operation is made visible to clients of the primary database, which at that point also acknowledges the client request. In some embodiments, by making the write operation visible (e.g. by updating the visibility point), the write operation becomes visible to all clients of the primary database. In some embodiments, the write operation can be applied to the tables in the primary database. In some embodiments, the acknowledgment of the request may be a synchronous acknowledgment, which causes a response to be returned to the requesting client. In some embodiments, the acknowledgment may be an asynchronous acknowledgment, where an asynchronous notification or callback is provided to the requesting client. In some embodiments, no acknowledgement may be provided to the requesting client, and the effect of the write operation simply appears in the durable state of the primary database to the clients.

At operation 754, the write operation is made visible to clients of the secondary database. This operation may be performed by the secondary database, in similar fashion as discussed in connection with operation 752 for the primary database.

Figure 8:
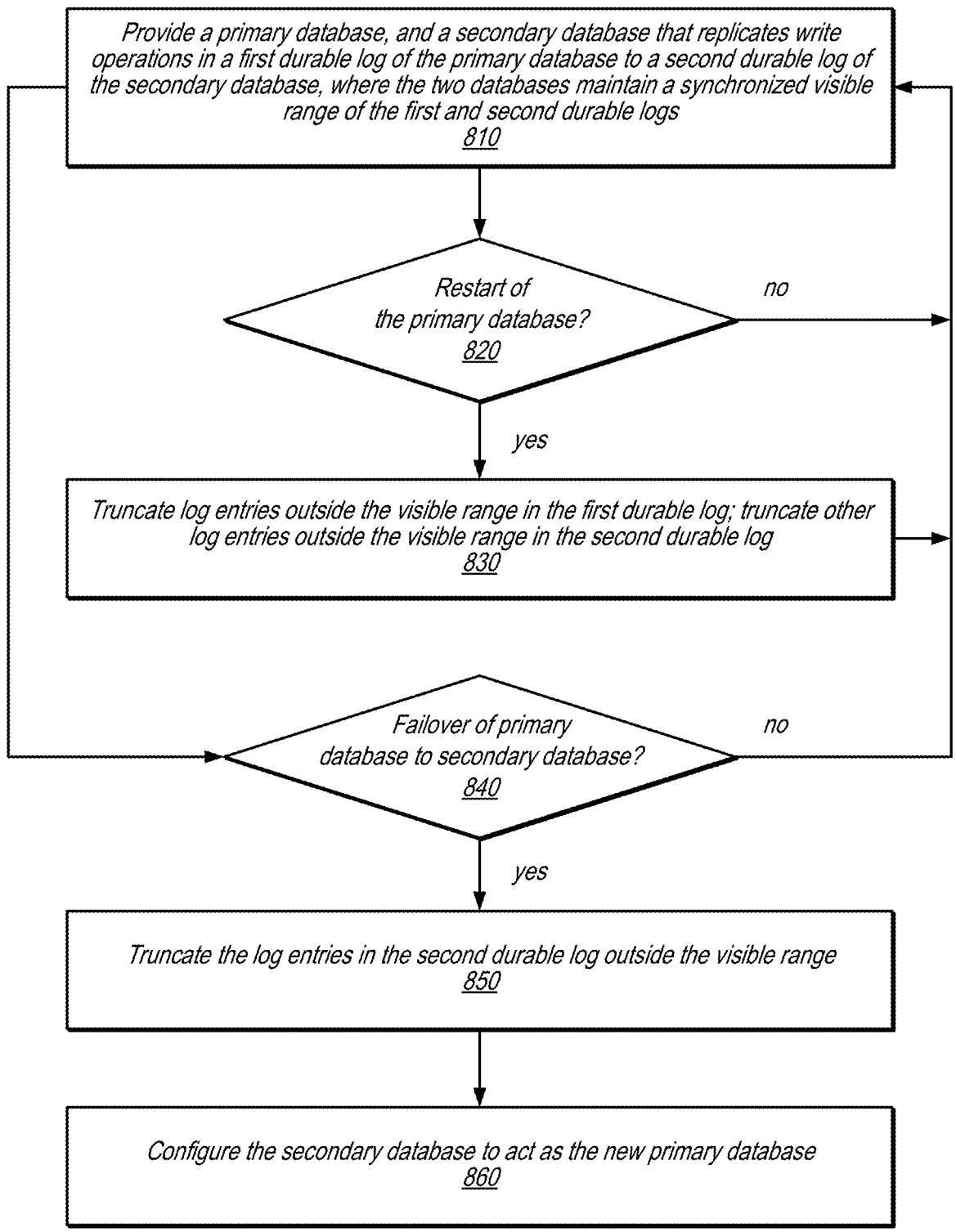
FIG. 8 is a flowchart illustrating example events that cause a truncating the durable log of a primary or secondary database that implement synchronous database mirroring using delayed visibility write operations, according to some embodiments.

FIG. 8 is a flowchart illustrating example events that cause a truncating the durable log of a primary or secondary database that implement synchronous database mirroring using delayed visibility write operations, according to some embodiments. The depicted process may be performed by the primary database 120 and the secondary database 140, as discussed in connection with FIG. 1.

At operation 810, a primary database and a secondary database are provided, where the secondary database replicates write operations in the primary database. In some embodiments, the secondary database may replicate the write operations in a first durable log of the primary database, to a second durable log of the secondary database. In some embodiments, the two databases may be configured to maintain a synchronized visible range of the first and second durable logs. The providing of the primary and replicating secondary databases in this fashion may be performed according to the process depicted in FIG. 7.

At operation 820, a determination is made whether is restart of the primary database is to be performed. If so, the process proceeds to operation 830, where log entries outside the visible range in the first durable log are truncated, and log entries outside the visible range of the second durable log are also truncated. In some embodiments, this truncation may be performed as part of the restart procedure of the primary database. In some embodiments, the truncation may be performed before or after the actual restart procedure. As may be understood, in some embodiments, the visibility point may represent the most advanced agreed-upon point of the durable state of all of the databases in the mirror group. Thus, when the primary database is restarted, any potentially inconsistent durable states of individual databases are simply discarded or invalidated, and the mirror group proceeds form the last agreed-upon durable state of the group. This minimal degree of data loss is well tolerated from the client perspective, because such data were never made visible to the clients.

At operation 840, a determination is made whether a failover of the primary database to the secondary database is to be performed. In some embodiments, this operation may be performed by a control plane component that is configured to detect a failure of the primary database. In some embodiments, the failure may be detected according to a peer-to-peer protocol, where some databases in the mirror group are configured to monitor the availability and/or health of other databases in the mirror group.

As shown, if a failover process is to be performed, the process proceeds to operation 850, where the log entries in the second durable outside the visible range are truncated. As discussed, in some embodiments, the visible range may represent the synchronized durable state of all databases in the mirror group. Thus, at a failover event, inconsistent durable state that are outside the visible range may simply be discarded, invalidated, or truncated. In some embodiments, if there are multiple secondary mirror databases in the mirror group, all of these databases may also truncate their log entries in the same manner, so that after the failover, all mirror databases will have truncated all inconsistent log entries outside the visible range.

At operation 860, the secondary database is configured to act as the new primary database. In some embodiments, this configuration may cause the secondary database to begin receiving and handling write requests. In some embodiments, the configuration may cause the replication agent (e.g. replication agent 156) of the secondary database to assume the duties of the primary database's replication agent. For example, in some embodiments, the replication of the secondary database may be configured to start monitoring the durable state of any surviving secondary databases in the mirror group, and periodically determine and/or broadcast new visibility points for the surviving group. In some embodiments, operation 860 may be performed at the same time or before operation 850, depending on the implementation of the failover process.

Figure 9:
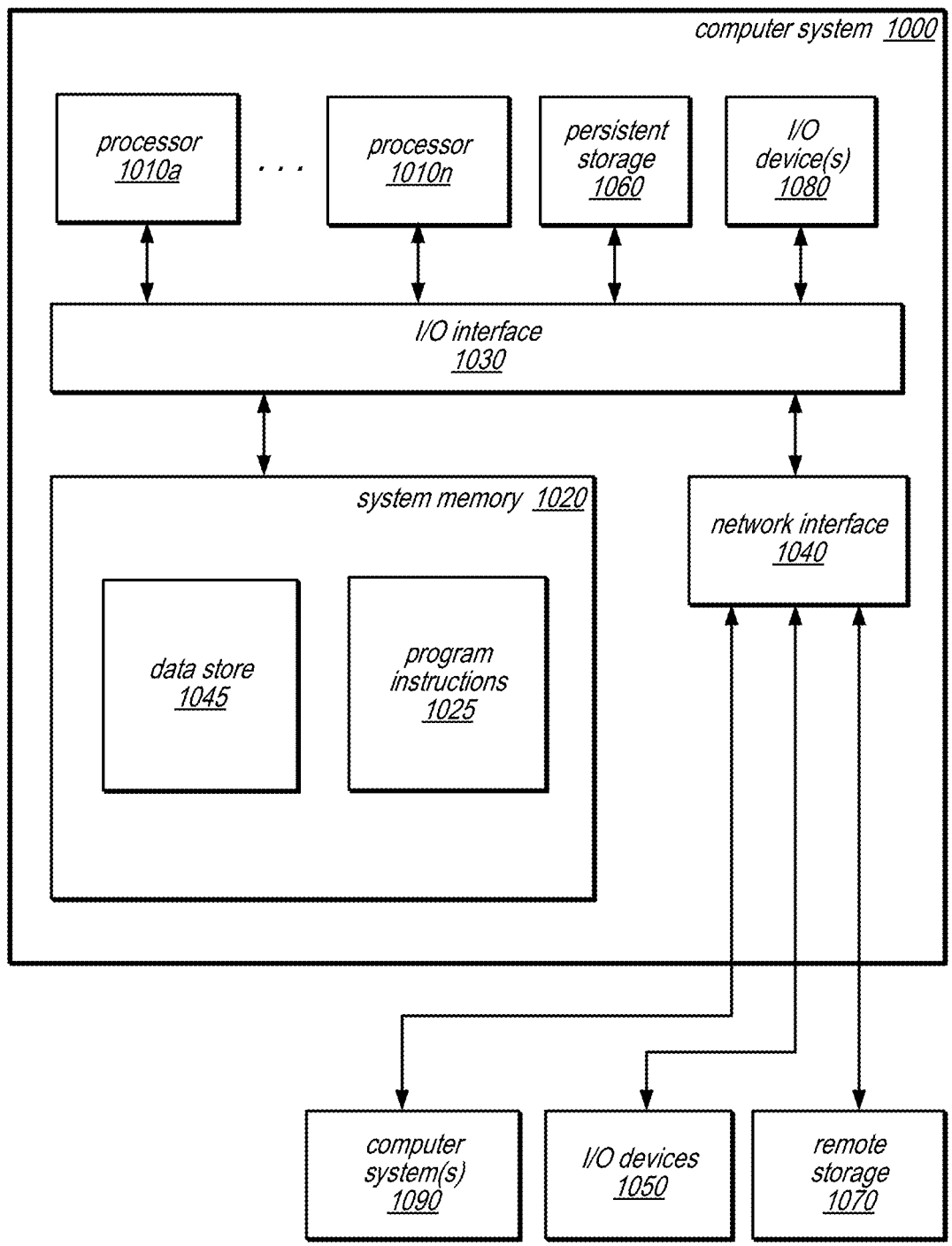
FIG. 9 is a block diagram illustrating an example computer system that can be used to implement one or more portions of synchronous database mirrors using delayed visibility write operations, according to some embodiments.

FIG. 9 is a block diagram illustrating an example computer system, according to various embodiments. For example, computer system 1000 may implement a read-write (or master/leader/primary) node of a database tier, a read-only node (or read replica/secondary node), replication agents, or one of a plurality of storage nodes of a separate distributed storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
one or more hardware processors with associated memory that implement a primary database and a secondary database, configured to:
receive a write operation at the primary database, wherein write operations to the primary database are replicated by the secondary database;
add the write operation to a first durable log of the primary database without making the write operation visible in the first durable log to clients of the primary database;
asynchronous to the addition of the write operation to the first durable log, replicate the write operation in a second durable log of the second database without making the write operation visible in the second durable log to clients of the secondary database;
based at least in part on a determination that the write operation has been made durable at both the primary and secondary databases:
cause the write operation to be made visible in the first durable log at the primary database; and
send an indication to the secondary database to cause the write operation to be made visible at the secondary database.

2. The system of claim 1, wherein the primary database is configured to:
during a restart process of the primary database, truncate one or more log entries in the first durable log outside a visible range of the first durable log.

3. The system of claim 1, wherein the secondary database is configured to:
during a failover process to replace the primary database, truncate one or more log entries in the second durable log outside a visible range of the second durable log.

4. The system of claim 1, wherein:
the write operation is requested by a client write request; and
the primary database is configured to acknowledge the client write request after the write operation is made visible in the first and second durable logs.

5. The system of claim 1, wherein:
the second database is configured to provide state information of the second durable log to the primary database; and
the determination that the write operation has been made durable at the secondary database is performed based at least in part on a monitoring of the state information of the second durable log.

6. A method comprising:
performing, by one or more hardware processors with associated memory that implement a primary database and a secondary database:
receiving a write operation at the primary database;
durably performing the write operation at the primary database without making the write operation visible to clients of the primary database;
asynchronous to the performance of the write operation at the primary database, durably performing the write operation at the secondary database without making the write operation visible to clients of the secondary database, wherein the secondary database is configured to replicate the primary database; and
based at least in part on a determination that the write operation has been made durable at both the primary and secondary databases, causing the write operation to be made visible to the clients of the primary and secondary databases.

7. The method of claim 6, wherein the write operation is performed at the primary database without confirming that a previous write operation has been durably performed at the secondary database.

8. The method of claim 6, wherein the primary and secondary databases are implemented by a database service executing on a service provider network, wherein the service provider network connects multiple provider network regions via a wide area network (WAN), and the primary and secondary databases are implemented in two different ones of the provider network regions.

9. The method of claim 6, wherein:
durably performing the write operation at the primary database comprises adding the write operation to a first durable log of the primary database;
durably performing the write operation at the secondary database comprises adding the write operation to a second durable log of the secondary database; and
the write operation is made visible in the primary and secondary databases synchronously to maintain a synchronized visible range of the first and second durable logs.

10. The method of claim 9, further comprising:
during a restart process of at least one of the primary database, truncating one or more log entries in the first durable log outside the visible range.

11. The method of claim 9, further comprising:
during a failover process to replace the primary database with the secondary database, truncating one or more log entries in the second durable log outside the visible range.

12. The method of claim 9, further comprising performing, by the primary database:
monitoring state information of the second durable log received from the secondary database; and wherein the determination that the write operation has been made durable is performed based at least in part on the monitoring of the state information of the second durable log.

13. The method of claim 12, wherein the determination that the write operation has been made durable at both the primary and secondary databases comprises:
determining a first highest in-sequence log entry in the first durable log;
determining, from the state information of the second durable log, a second highest in-sequence log entry in the second durable log; and
determining a new visibility point in the first and second durable logs, wherein the new visibility point is a lower of the first highest in-sequence log entry and the second highest in-sequence log entry.

14. The method of claim 13, further comprising:
sending, by the primary database, the new visibility point to the secondary database; and
updating, by the secondary database, the visible range of the second durable log according to the new visibility point.

15. The method of claim 9, wherein:
the primary database is replicated by a plurality of mirror databases, including the secondary database, wherein individual ones of the mirror databases are configured to maintain the synchronized visible range in their respective durable logs; and
the write operation is made visible in at least one of the plurality of mirror databases based at least in part on a determination that the write operation has been made durable in all of the plurality of the mirror databases.

16. The method of claim 15, wherein:
the primary database is configured to enforce a maximum mirror lag threshold for one of mirror databases; and
further comprising performing, by the primary database:
monitoring a state of a durable log of the mirror database to determine that the maximum mirror lag threshold is exceeded; and
responsive to the determination that the maximum mirror lag threshold is exceeded, blocking performance of further write operations in the primary database.

17. The method of claim 6, further comprising performing, by the primary database:
receiving the write operation as part of a client write request; and
acknowledging the client write request after making the write operation visible in the first durable log.

18. One or more non-transitory computer-accessible storage media storing program instructions that when executed on or across one or more processors of a primary database, cause the primary database to:
receive a write operation;
durably perform the write operation at the primary database without making the write operation visible to clients of the primary database;
send the write operation to a secondary database to cause the write operation to be asynchronously and durably performed at the secondary database without making the write operation visible to clients of the secondary database; and
based at least in part on a determination that the write operation has been made durable at both the primary and secondary databases, cause the write operation to be made visible to the clients of the primary and secondary databases.

19. The one or more non-transitory computer-accessible storage media of claim 18, wherein the program instructions when executed on or across the one or more processors cause the primary database to perform the write operation without confirming that a previous write operation has been durably performed at the secondary database.

20. The one or more non-transitory computer-accessible storage media of claim 18, wherein:
to durably perform the write operation at the primary database, the program instructions when executed on or across the one or more processors cause the primary database to add the write operation to a first durable log of the primary database;
to cause the write operation to be asynchronously and durably performed at the secondary database, the program instructions when executed on or across the one or more processors cause the secondary database to add the write operation to a second durable log of the secondary database; and
to cause the write operation to be made visible, the program instructions when executed on or across the one or more processors cause the primary database and the secondary database to make the write operation visible synchronously to maintain a synchronized visible range of the first and second durable logs.

* * * * *